Patented July 4, 1939

2,164,585

UNITED STATES PATENT OFFICE 2,164,585

ADHESIVE

Winfrid Hentrich, Dusseldorf-Reisholz, and Rudolf Köhler, Dusseldorf, Germany, assignors to Henkel & Cie, G. m. b. H., Dusseldorf-Holthausen, Germany, a corporation of Germany No Drawing. Application November 7, 1936, Serial No. 109,752. In Germany May 6, 1936

8 Claims. (Cl. 134—23.5)

This invention relates to a new class of adhesives which may be referred to broadly as soluble salts of cellulose aralkyl ether carboxylic acids and to a method of producing the same. These adhesives are employed in the form of dilute aqueous colloidal solutions in a concentration which usually is not in excess of 8% adhesive compound.

It is known in the prior art that ethers may be produced from cellulose and haloalkyl carboxylic acids, but these products have been used or suggested for use only for other purposes than for the production of adhesives. Up to the time of the present invention, no one had discovered that aqueous colloidal solutions of salts of cellulose-oxy-alkyl aryl carboxylic acids comprise compositions excellently adapted for certain cementing and pasting purposes.

The objects of the present invention are to provide new adhesives which are low in cost, economical in use, stable against deterioration, strong in cementing power, marketable in the form of powder and readily put in condition for use by dissolving in water.

The colloidal solutions of the adhesive products of the present invention are suitable for the cementation or pasting of papers as in the production of cartons and for all cementing purposes employed in the bookbinding trade; also, for the hanging of wall paper and as a dye binding agent in priming walls of interior rooms.

The most exemplary adhesive compounds of the present invention are the sodium salts of the cellulose aralkyl ether carboxylic acids, particularly those compounds in which the alkyl radical is of low molecular weight. The preferred compounds are the sodium, potassium, ammonium and triethanol amine salts of cellulose-benzyl ether carboxylic acids, of hydroxy-benzyl ether carboxylic acids, of their homologues and analogues, and as well of their substitution products, and other like compounds. These compounds have the following general formula:

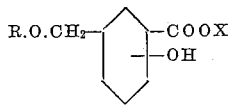

wherein R denotes the radical of a cellulosic compound, X denotes the sodium or potassium or the ammonium radical or the triethynol amine radical, the OH radical being optional.

These adhesive products are prepared by reacting haloalkyl aryl carboxylic acids, such as, for example, chlormethyl-benzoic acid, chlormethyl-salicylic acid, and chlormethyl-oresotic acid with natural cellulose, regenerated cellulose or modified cellulose, preferably in the presence of an alkaline reacting material such as sodium hydroxide. The resulting ethers are then preferably concentrated by drying and thereafter reduced to a paste or powdered form suitable for marketing.

When the adhesive is to be applied, for example, in paper hanging, the user can prepare the dry or concentrated adhesive in condition for use by merely dissolving the same in cold water, the resulting colloidal solution being of a highly viscous or gelatinous nature. Dilute colloidal solutions prepared in this manner have strong adhesive properties, the proportion of the adhesive product being suitably from 3–5%. The adhesives of the present invention are capable of taking up large quantities of water and hence are superior in efficiency to adhesives now on the market generally employed for the hanging of wall paper. These adhesives are also stable against the action of micro-organisms and therefore do not require the addition of any preserving agent to prevent deterioration.

Example

Alkali cellulose is reacted with an equivalent quantity of the sodium salt of chlormethyl cresotic acid thereby forming the sodium salt of cellulose-oxy-methyl cresotic acid. A 3% colloidal solution possesses strong adhesive qualities and is especially suitable for the hanging of wall paper.

The adhesives of the present invention mix well with other adhesives, for example, those produced from starch, and the present invention therefore includes such mixtures.

As disclosed herein, the water-soluble salts of the cellulose ether alkyl aryl carboxylic acids in which the alkyl group is a methylene radical represent the preferred compounds of this invention, but homologues containing other low molecular alkyl radicals of 4 or less carbon atoms are also operable.

It should be understood that the present invention is not limited to the specific disclosure of compounds herein, but that it extends to all equivalent compounds which will occur to those skilled in the art and which are within the scope of the terms of the appended claims.

We claim:

1. A novel adhesive composed at least in part of an aqueous colloidal solution of a soluble salt of a cellulose mononuclear aralkyl ether carboxylic acid, said ether carboxylic acid having its ethereal oxygen atom joined to the aromatic nucleus through an alkyl radical having 4 or less carbon atoms.

2. A novel adhesive adapted for the hanging of wall paper, cementing of paper, for sizing and the like, which comprises an aqueous colloidal solution of a soluble salt of an ether of cellulose with a mononuclear aralkyl carboxylic acid radical, the ethereal oxygen atom being joined to the alkyl radical which alkyl radical has 4 or less carbon atoms.

3. An adhesive product in concentrated form composed at least in part of a water soluble salt of a cellulose-oxy-alkyl-mononuclear-aromatic-carboxylic acid capable of being put in condition for use by merely dissolving in sufficient water to produce a dilute colloidal solution, said alkyl radical having 4 or less carbon atoms.

4. An adhesive powder for cementing papers, sizing and like purposes which comprises a water soluble salt of a cellulose-oxy-methyl-mononuclear-aromatic-carboxylic acid.

5. An adhesive composed of an aqueous colloidal solution of a sodium salt of an ether of cellulose with a methyl mononuclear aromatic carboxylic acid wherein the ethereal oxygen atom is joined to the methyl radical.

6. An adhesive composed of an aqueous colloidal solution of a soluble salt of an ether of cellulose with methyl-phenyl-carboxylic acid wherein the ethereal oxygen atom is joined to the methyl radical.

7. An adhesive composed of an aqueous colloidal solution of a soluble salt of an ether of cellulose with methyl cresotic acid wherein the ethereal oxygen atom is joined to the methyl radical.

8. The process of producing an adhesive powder which comprises reacting cellulose with a halomethyl mononuclear aromatic carboxylic acid with the aid of an alkaline reacting material adapted to form a salt selected from the group consisting of alkali metals, ammonia and triethanol amine salts, drying and powdering the ether thereby obtained.

WINFRID HENTRICH.
RUDOLF KÖHLER.